(12) United States Patent
Bronczyk et al.

(10) Patent No.: US 8,961,008 B2
(45) Date of Patent: Feb. 24, 2015

(54) MODULAR DUAL-COMPARTMENT TEMPERATURE TRANSMITTER

(75) Inventors: Andrew J. Bronczyk, Chanhassen, MN (US); Aaron A. Perrault, Shakopee, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 13/251,726

(22) Filed: Oct. 3, 2011

(65) Prior Publication Data
US 2013/0083824 A1    Apr. 4, 2013

(51) Int. Cl.
G01K 1/00 (2006.01)
H01R 13/44 (2006.01)
G01N 33/00 (2006.01)
G01K 1/02 (2006.01)

(52) U.S. Cl.
CPC .......................................... *G01K 1/02* (2013.01)
USPC .............................. 374/208; 73/866; 439/136

(58) Field of Classification Search
CPC .................................. G01J 5/04; H01R 13/447
USPC ........................................... 73/866; 439/136
See application file for complete search history.

(56) References Cited

U.S. PATENT DOCUMENTS

| | | | | |
|---|---|---|---|---|
| 4,623,266 A * | 11/1986 | Kielb | | 374/181 |
| 4,958,938 A | 9/1990 | Schwartz et al. | | 374/208 |
| 5,451,939 A * | 9/1995 | Price | | 340/870.31 |
| 5,498,079 A | 3/1996 | Price | | |
| 5,546,804 A | 8/1996 | Johnson et al. | | |
| 5,606,513 A | 2/1997 | Louwagie et al. | | 364/510 |
| 5,954,526 A * | 9/1999 | Smith | | 439/136 |
| 6,062,095 A * | 5/2000 | Mulrooney et al. | | 73/866.5 |
| 6,146,188 A * | 11/2000 | Snyder | | 439/475 |
| 6,356,191 B1 | 3/2002 | Kirkpatrick et al. | | |
| 6,484,107 B1 * | 11/2002 | Roper et al. | | 702/50 |
| 6,546,805 B2 | 4/2003 | Fandrey et al. | | 73/753 |
| 6,790,050 B1 * | 9/2004 | Roth-Stielow et al. | | 439/76.2 |
| 7,164,262 B2 | 1/2007 | Zacay | | 324/115 |
| 7,190,053 B2 | 3/2007 | Orth et al. | | |

(Continued)

FOREIGN PATENT DOCUMENTS

| | | |
|---|---|---|
| CN | 20167398 Y | 6/1994 |
| CN | 1898534 A | 1/2007 |

(Continued)

OTHER PUBLICATIONS

First Office Action from the corresponding Chinese patent application No. 201120555381.1 dated Jun. 6, 2012.

(Continued)

*Primary Examiner* — Lisa Caputo
*Assistant Examiner* — Nasir U Ahmed
(74) *Attorney, Agent, or Firm* — Westman, Champlin & Koehler, P.A.

(57) ABSTRACT

A temperature transmitter includes a dual-compartment housing and a head-mount temperature transmitter electronics module. The dual-compartment housing has a first compartment and a second compartment. The first compartment is configured to receive field wiring at a terminal block through at least one conduit. The first and second compartments are separated except for an electrical feedthrough therebetween. A head-mount temperature transmitter electronics module is disposed in the second compartment and is operably coupled to the terminal block in the first compartment.

13 Claims, 9 Drawing Sheets

(56) References Cited

U.S. PATENT DOCUMENTS

| | | | |
|---|---|---|---|
| 7,421,258 B2 * | 9/2008 | Bauschke et al. | 455/128 |
| 7,550,826 B2 | 6/2009 | Orth et al. | |
| 8,128,284 B2 * | 3/2012 | Martensson | 374/208 |
| 8,217,782 B2 | 7/2012 | Nelson et al. | 340/539.1 |
| 8,223,478 B2 | 7/2012 | Perrault et al. | |
| 8,290,721 B2 | 10/2012 | Wehrs et al. | 702/45 |
| 8,408,787 B2 | 4/2013 | Rud et al. | |
| 2009/0257722 A1 * | 10/2009 | Fisher et al. | 385/115 |
| 2013/0083824 A1 | 4/2013 | Bronczyk et al. | |

FOREIGN PATENT DOCUMENTS

| | | |
|---|---|---|
| CN | 2857251 Y | 1/2007 |
| CN | 101776491 A | 7/2010 |
| CN | 202562633 U | 11/2012 |

OTHER PUBLICATIONS

Product Data Sheet. Rosemount 644 Temperature Transmitter. Oct. 2010 by Emerson Process Management.
Product Data Sheet 3.80. THZ&TDZ Smart HART® Temperature Transmitters. Apr. 2005 by Moore Industries.
Bulletin 1C50A0-E. Temperature Transmitters YTA Series. Yokogawa Electric Corporation.
Product Data Sheet. Rosemount 3144P Temperature Transmitter. Nov. 2010 by Emerson Process Management.
Invitation to Pay Additional Fee from the corresponding International patent application No. PCT/US12/043705 dated May 24, 2013.
Wika: "Digital Temperature Transmitter", Jul. 2008.
Notification of Transmittal of the International Search Report and the Written Opinion of the International Searching Authority for PCT/US2012/043705, dated Apr. 23, 2014.
Communication Under Rules 161(1) and 126 EPC from European Application No. 12743559.2, dated Jul. 4, 2014.
Office Action from Chinese Application No. 201110443913.7, dated Mar. 26, 2014.
Rosemount "Rosemount 3144P Temperature Transmitter," Mar. 2008.
Copy of Chinese Office Action from CN 201110443913.7, dated Nov. 4, 2014.

* cited by examiner

FIG. 1

PRIOR ART

MODULAR DUAL-COMPARTMENT TEMPERATURE TRANSMITTER

BACKGROUND

The process industry employs process variable transmitters to monitor process variables associated with substances such as solids, slurries, liquids, vapors, and gasses in chemical, pulp, petroleum, pharmaceutical, food and other processing plants. Process variables include pressure, temperature, flow, level, turbidity, density, concentration, chemical composition and other properties. A process fluid temperature transmitter provides an output related to a sensed process fluid temperature. The temperature transmitter output can be communicated over a process communication loop to a control room, or the output can be communicated to another process device such that the process can be monitored and controlled. In order to monitor a process fluid temperature, the transmitter includes or is coupled to a sensor, such as a resistance temperature device (RTD) or thermocouple.

One specific type of temperature transmitter is known as a head-mount temperature transmitter. Such a transmitter generally includes a connection head or junction box that is ruggedized for exposure to harsh environments. The connection head can be designed in accordance with the criteria of current DIN standard 43 729 Form B. Such design is relatively smaller than other process variable transmitter enclosures. The smaller design facilitates transmitter mounting in crowded installation environments. Further, the smaller design also provides a smaller mass coupled to the sensor probe. Such mass reduction reduces the possibility of vibration damage occurring in the transmitter.

The connection head or junction box can be explosion-proof in conformance with NEC Sections 500-503, dated 1996. Typically, an electronics module is placed within the connection head and mounted with fasteners to provide a transmitter that is highly modular. Such modularity facilitates transmitter configuration changes as well as maintenance. An example of such a head-mount temperature transmitter is the Model 248 Temperature Transmitter available from Rosemount Inc. of Chanhassen, Minn.

Another specific type of temperature transmitter is known as a rail-mount temperature transmitter. A rail-mount temperature transmitter may include many of the same electronics as a head-mount temperature transmitter, but is configured to be mounted directly to a wall or a DIN rail.

A third specific type of temperature transmitter is generally specified for very high accuracy applications and/or environments that provide an electromagnetic interference challenge. In such situations, a dual-compartment, explosion proof housing is provided. Typically the field wiring for the process communication loop conductors and sensor wires are provided in the first compartment and the transmitter electronics are provided in a second compartment. This approach achieves the necessary robustness to the environment by utilizing the dual-compartment in order to isolate the field wiring from the measurement electronics via an EMI (electromagnetic interference) filter positioned between the first and second compartments. In some cases, no filter is used and conductors simply pass through a feedthrough between the first and second compartments While a dual-compartment temperature transmitter typically requires additional cost, the cost is offset by the extreme robustness and/or accuracy provided by the device.

The provision of three distinct types of temperature transmitters generally requires a consumer to pick one specific type and accept the various advantages/disadvantages of the performance and/or cost of the selected type. Providing a temperature transmitter product offering that could potentially bridge some of the distinct types of applications and cost requirements would allow consumers to select products with a potentially better fit for their particular applications.

SUMMARY

A temperature transmitter includes a dual-compartment housing and a head-mount temperature transmitter electronics module. The dual-compartment housing has a first compartment and a second compartment. The first compartment is configured to receive field wiring at a terminal block through at least one conduit. The first and second compartments are separated except for an electrical feedthrough therebetween. A head-mount temperature transmitter electronics module is disposed in the second compartment and is operably coupled to the terminal block in the first compartment.

DETAILED DESCRIPTION OF ILLUSTRATIVE EMBODIMENTS

Figure 1:
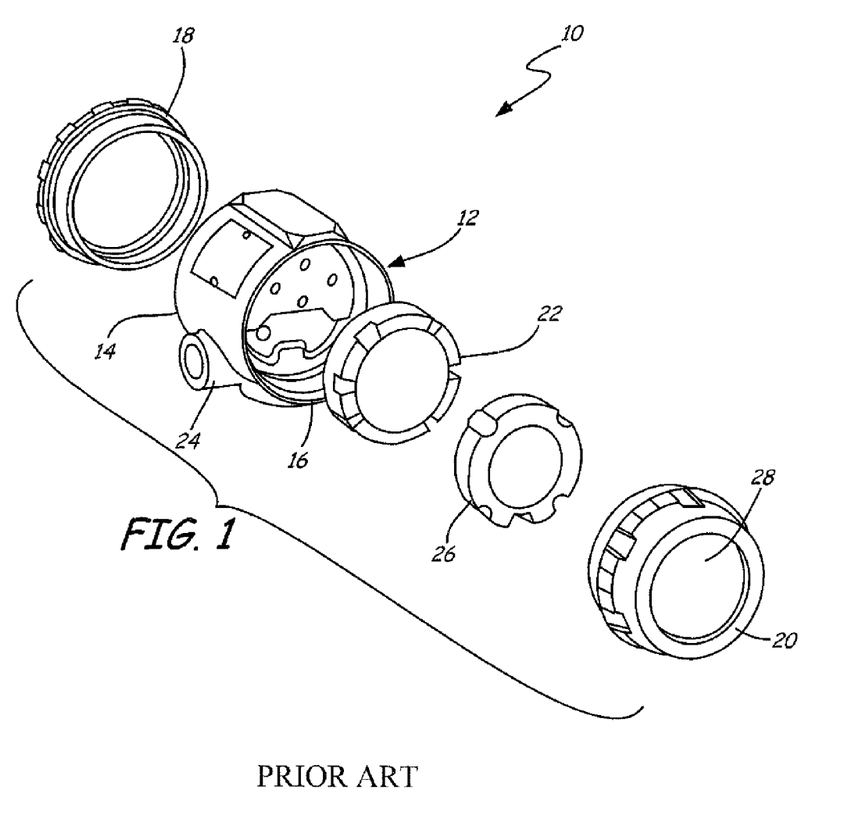
FIG. 1 is a diagrammatic exploded view of a dual-compartment temperature transmitter in accordance with the prior art.

FIG. 1 is a diagrammatic exploded view of a dual-compartment temperature transmitter in accordance with the prior art. Transmitter 10 includes dual-compartment housing 12 having a first side 14 and a second side 16. Respective covers 18, 20 coupled to first side 14 and second side 16 seal transmitter electronics 22 within an explosion proof housing. A pair of conduit entries (one of which is shown at reference numeral 24) provides for access to field wiring, such as a process communication loop. Additionally, one or more temperature sensors are generally coupled to transmitter electronics 22 via a conduit entry. The field wiring enters transmitter 10 through the conduits and passes into a first compartment proximate end 14. In this compartment, there is a terminal block to receive the field wiring and make a secure electrical and mechanical connection to the field wiring. A wall within housing 12 separates the first compartment from the second compartment (within which electronics module 22 resides). The wall is entirely continuous except for a feedthrough that provides electrical wiring connections between the first compartment and the second compartment. Additionally, one or more electromagnetic interference filters are provided to inhibit any electromagnetic interference that may be conducted through the feedthrough. The sealing of the first compartment from the second compartment helps increase the robustness of the entire housing, and facilitates compliance with safety specifications, such as additional explosion proof ratings, such as Class 1, Division 1, Group a.

Electronics module 22 is electrically coupled to contacts within second compartment proximate end 16 and is configured, via hardware, software, or both, to obtain a process temperature measurement from an attached temperature sensor and generate a process temperature variable output over a process communication loop. In some instances, an external display of the process temperature output can be shown via an LCD module 26 which is visible through window 28 of end cap 20.

A dual-compartment temperature transmitter generally represents the most robust, high accuracy, single point temperature measurement solution offered by manufacturers. It is also generally the most costly temperature solution for a consumer.

Figure 2:
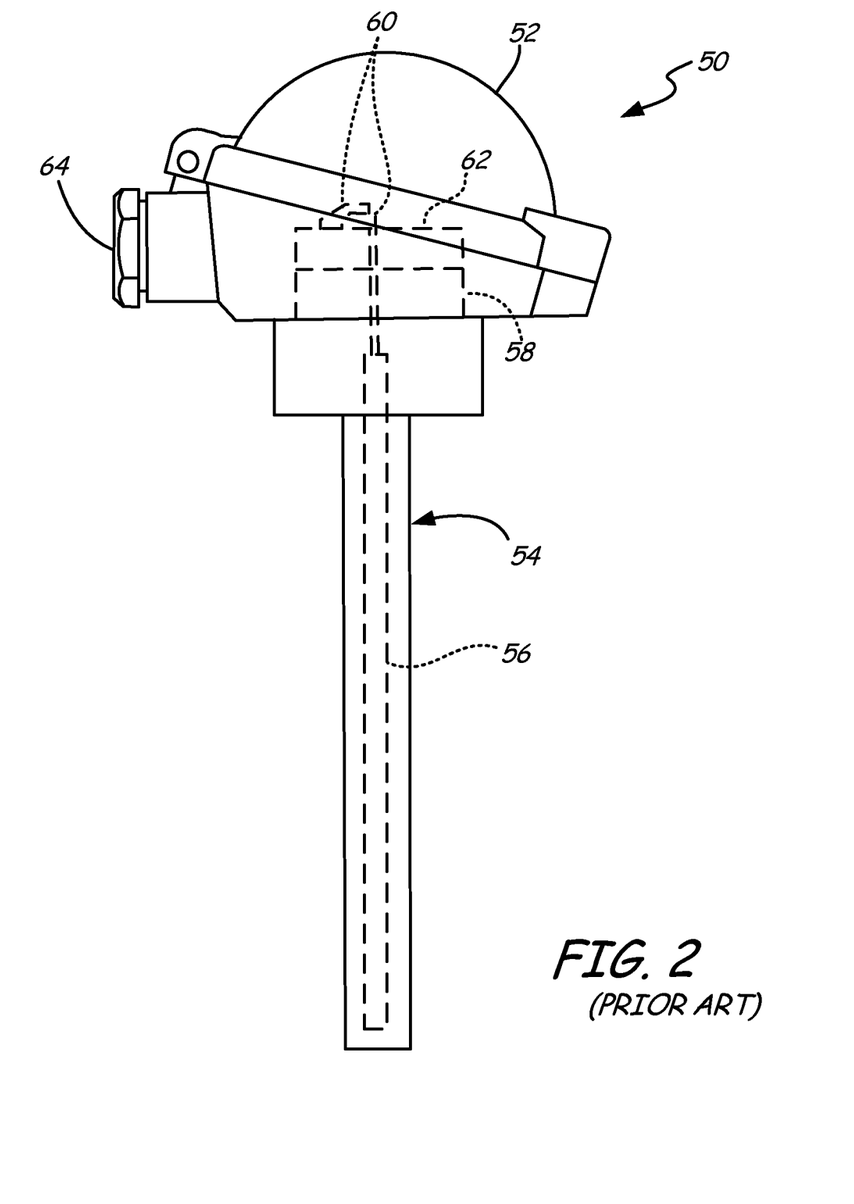
FIG. 2 is a diagrammatic view of a head-mount temperature transmitter in accordance with the prior art.

Another type of temperature transmitter is known as a head-mount temperature transmitter. FIG. 2 is a diagrammatic view of a head-mount temperature transmitter 50 in accordance with the prior art. Transmitter 50 includes housing 52 coupled to a temperature sensitive probe 54 having a temperature sensor 56 disposed within a thermowell therein. Temperature sensor 56 is operably coupled to head-mount transmitter electronics 58 via conductors 60. In order to accommodate an extremely small form factor, electronics 58 are generally provided in the form of a small circular puck-shaped device with wiring terminations being effected directly on a top surface 62 thereof. Connections to a process communication loop are done via conduit entry 64.

Figure 3:
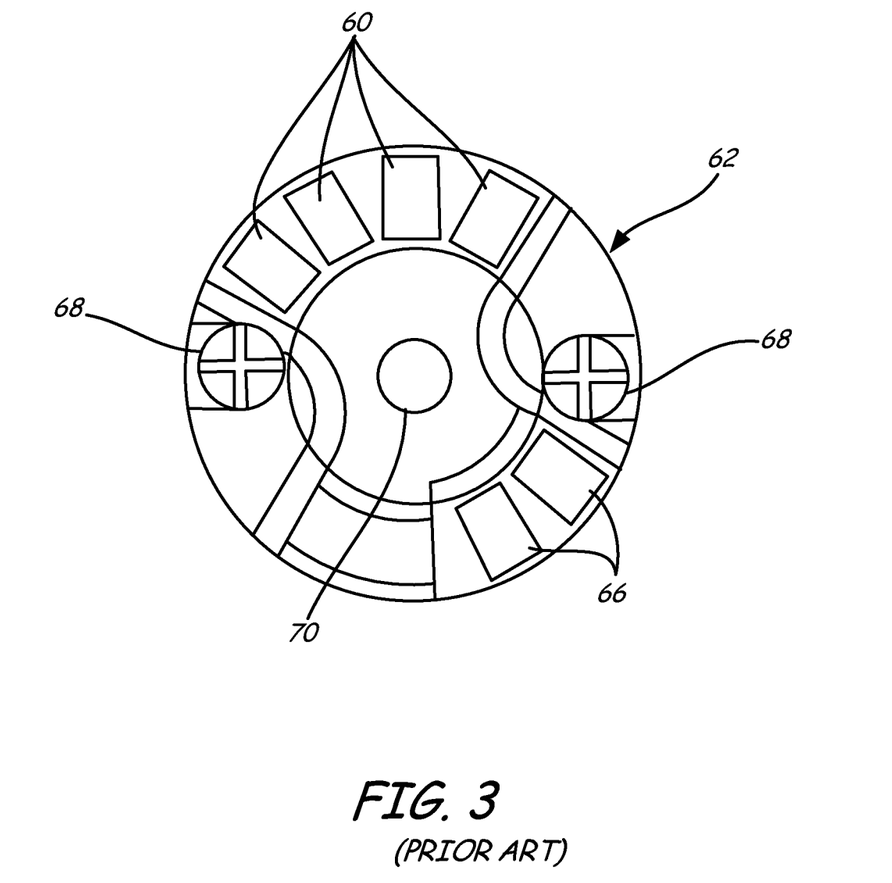
FIG. 3 is a top plan view of head-mount temperature transmitter electronics.

FIG. 3 is a top plan view of head-mount temperature transmitter electronics 62. Various terminals 60 are provided on the top surface thereof for coupling to a temperature sensor, such as a thermocouple or resistance temperature device (RTD). Coupling electronics 62 to a process communication loop is generally done via terminals 66 through conduit entry 64. A plurality of fasteners 68 are provided to secure electronics 62 within housing 52. Access to the temperature sensor wires is generally provided via center aperture 70. The device shown in FIGS. 2 and 3 can generally be provided at a substantially lower cost than the device illustrated in FIG. 1. However, the device shown in FIGS. 2 and 3 may not be robust enough for some process temperature measurement applications, and/or may be more susceptible to electromagnetic interference than the device illustrated in FIG. 1. Further still, if sensor electronics 62 should fail or need to be replaced or upgraded, all field wiring must generally be decoupled in order to remove electronics 62 from housing 52.

Figure 4:
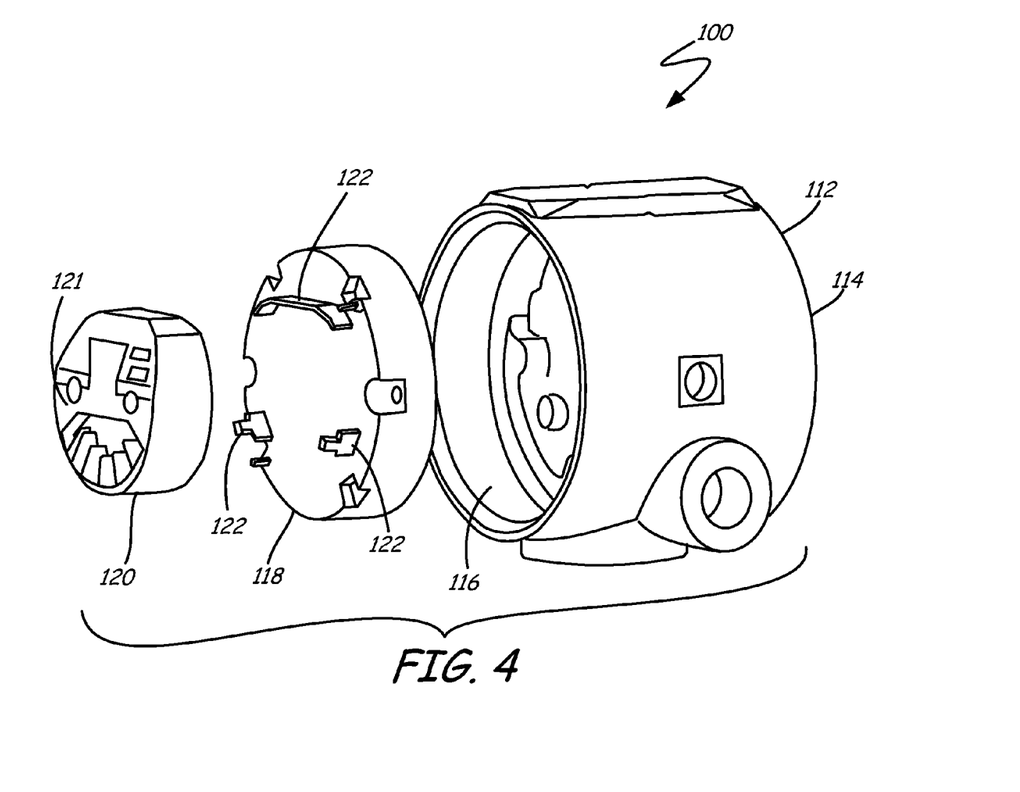
FIG. 4 is a diagrammatic exploded view of a modular dual-compartment temperature transmitter in accordance with the embodiment of the present invention.

FIG. 4 is a diagrammatic exploded view of a modular dual-compartment temperature transmitter in accordance with the embodiment of the present invention. Transmitter 100 includes housing 112 that may, in fact, be identical to housing 12 described with respect to FIG. 1. Transmitter 112 has a first compartment 114 to receive and connect field wiring such as process communication conductors and/or sensor conductors. Second compartment 116 receives and maintains transmitter electronics. However, in place of transmitter electronics, such as module 22 illustrated in FIG. 1, a modular adapter 118 is provided that makes electrical contact with cooperative pins or other suitable conductors inside second compartment 116 in much the same fashion that a prior art electronics module would make. However, those electrical connections are then routed to appropriate positions on module 118 in order to electrically couple to a head-mount form factor temperature transmitter electronics module 120. Module 120 includes a termination surface that includes a number of screw terminals that would allow module 120 to function as a head-mount temperature transmitter. Transmitter electronics module 120 includes transmitter electronics that are configured to measure an electrical property of a temperature sensor and provide an indication thereof over a process communication loop. Transmitter electronics module 120 is preferably sized to fit within all applicable DIN head-mount enclosures. It is preferred that transmitter electronics module 120 have a diameter of 2.4 inches or smaller in order to fit within DIN A head mount applications. It is further preferred that transmitter electronics module 120 have a diameter of 1.7 inches or smaller to fit within DIN B head mount applications. The DIN standard is a known standard that specifies space limitations in a connection head. More information regarding the DIN standard can be found by reviewing the standard: DIN 43 729.

Adapter module 118 includes a number of features 122 that are sized and positioned to maintain transmitter electronics module 120 in a unique rotational position. As an example of an embodiment of the present invention, housing 112 may be identical to that currently sold in conjunction with the Model 3144P dual-compartment pressure transmitter available from Rosemount Inc., of Chanhassen, Minn. Additionally, transmitter electronics module 120 may be that electronics module sold in conjunction with the Model 644 temperature transmitter. This is typically a lower cost device than a traditional electronics module of a dual-compartment temperature transmitter. Moreover, while transmitter electronics module 120 will have terminals to receive field wiring, no such field wire will be coupled to those terminals. Instead, the field wiring of transmitter 100 is effected within the first compartment 114 and passed via a feedthrough into electrical connections within adapter module 118. These electrical connections are then coupled to transmitter electronics module 120 in any suitable manner.

Figure 5:
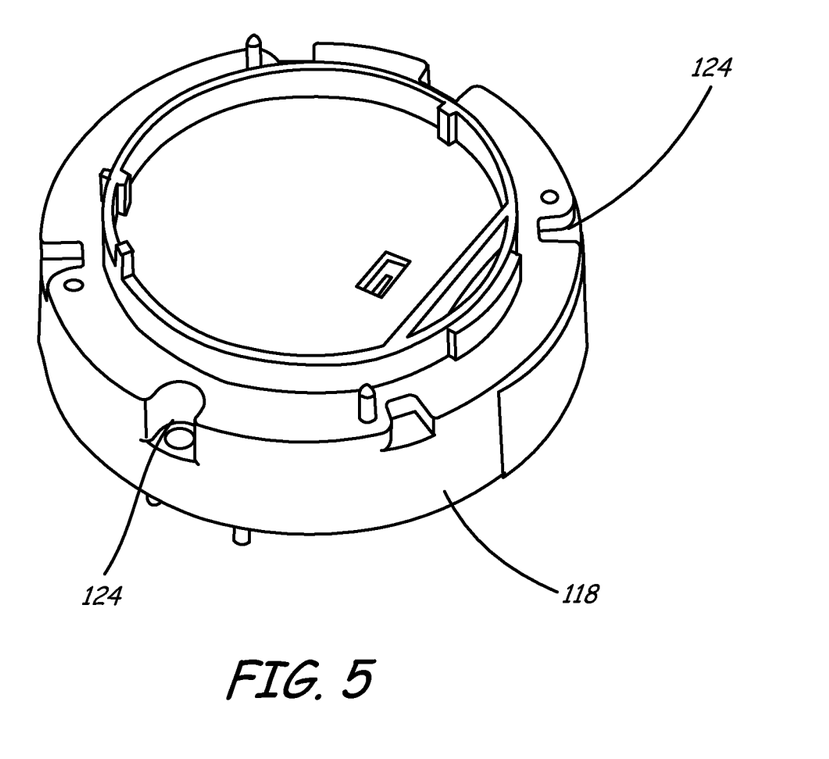
FIG. 5 is a perspective view of an adapter module in accordance with the embodiment of the present invention.

FIG. 5 is a perspective view of adapter module 118 in accordance with the embodiment of the present invention. Adapter module 118 includes a number of mounting holes 124 to mount within second compartment 116.

Figure 6A:
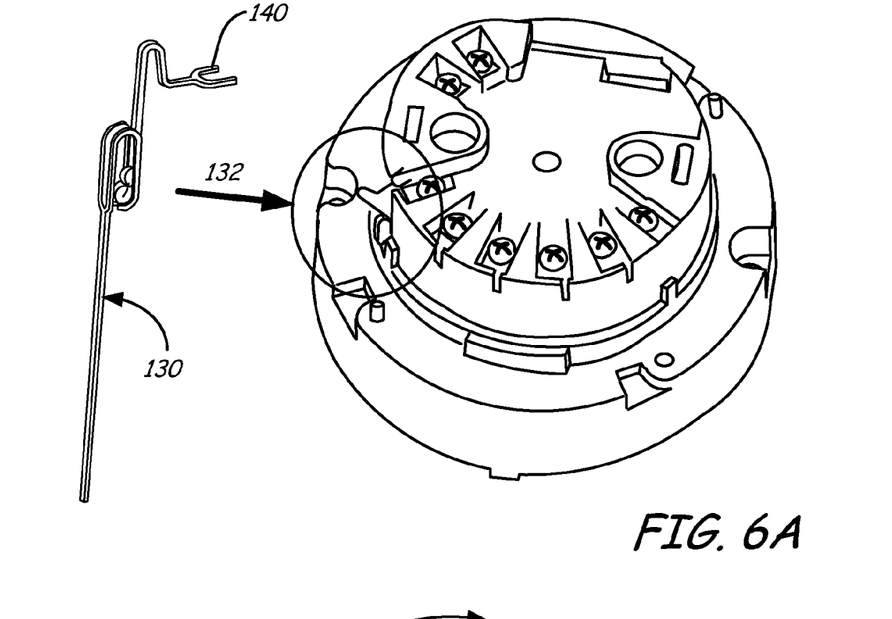
FIGS. 6A-6C illustrate one example of connecting a head-mount temperature transmitter to an adapter module in accordance with an embodiment of the present invention.
Figure 6B:
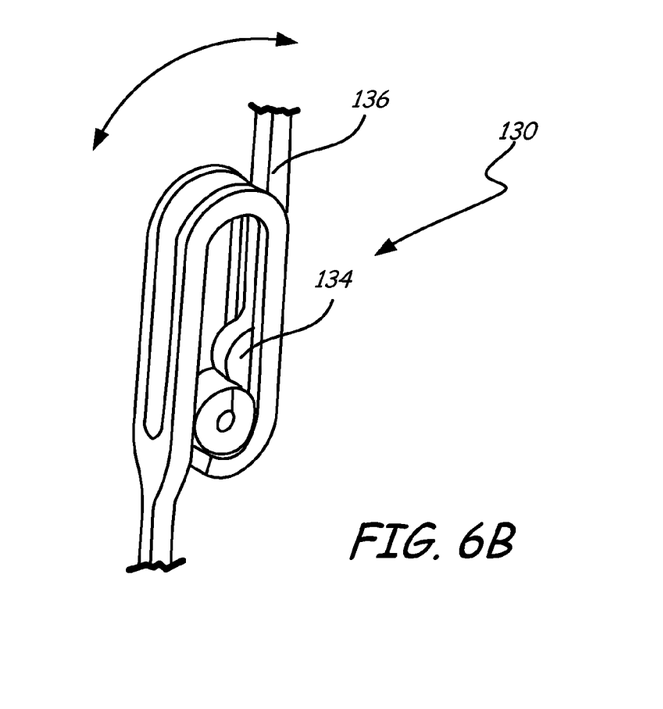
Figure 6C:
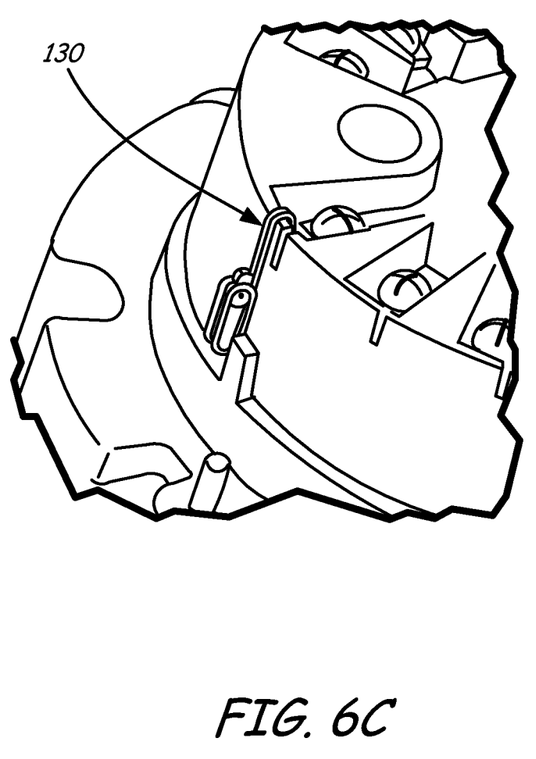

As set forth above, the electrical interconnection between transmitter electronics module 120 and adapter module 118 can be performed in any suitable manner. FIGS. 6A-6C illustrate one example of such connection. In this example, electrical connections are still made to the screw terminals on the top surface of transmitter electronics module 120. However, since transmitter electronics module 120 must be dropped into position, the electrical connectors themselves must be movable in order to accommodate the mounting of transmitter electronics module 120 into adapter module 118. Once transmitter electronics module 120 is mounted within adapter module 118, the connectors of module 118 are moved back into place and screwed to the terminals on the top surface of transmitter electronics module 120. FIG. 6A illustrates one such electrical coupler 130, and shows, within circle 132 connector 130 in a disengaged state. FIG. 6B illustrates a substantially enlarged perspective view of a portion of connector 130. Notably, connector 130 includes a pivot 134 that allows shaft 136 to rotate in the direction of arrows 138. This allows the c-shaped portion 140 to be moved out of the way as transmitter electronics module 120 is dropped into its mounting position. In addition to the ability of the pin to pivot out of the way of transmitter electronics module 120, it is also necessary for the pin to move vertically so as to clear the edge of the housing. The section of the pin shown in FIG. 6B allows for the vertical travel. If the section is tapered such that the bottom is higher than the top, an electrical connection will be made between the two parts of the pin at this junction when the pin is screwed down as shown in FIG. 6C. Once transmitter electronics module 120 is correctly mounted, the terminals are pivoted back into their engaged position and mated with the screw terminals of module 120. FIG. 6C shows such a state.

Figure 7:
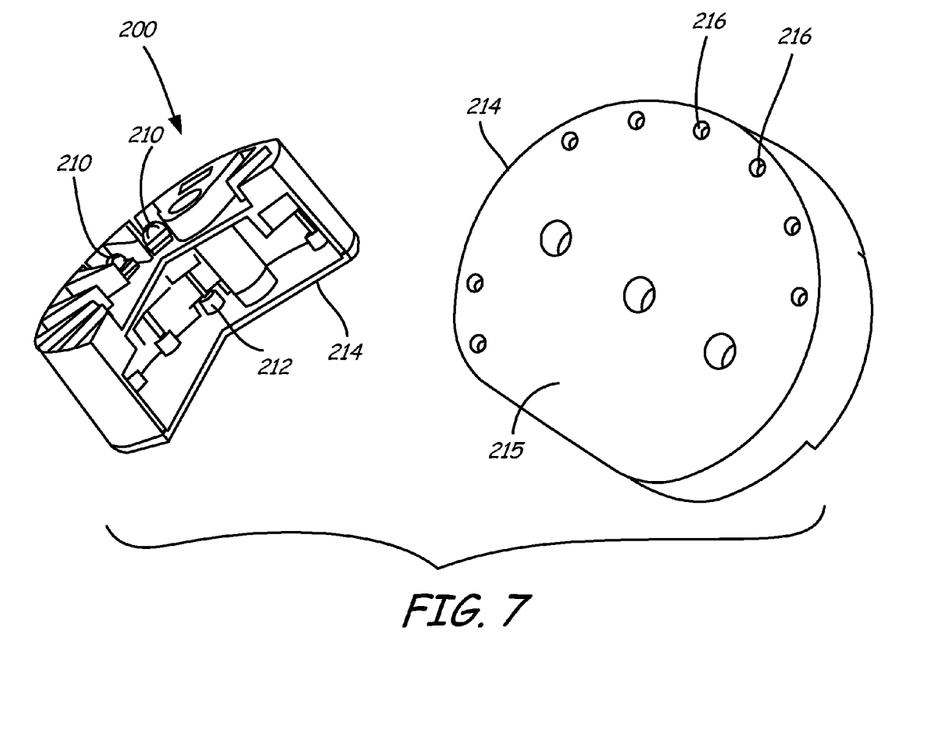
FIG. 7 illustrates a partial perspective cut away view and bottom perspective view of a head-mount temperature transmitter in accordance with an embodiment of the present invention.
Figure 8:
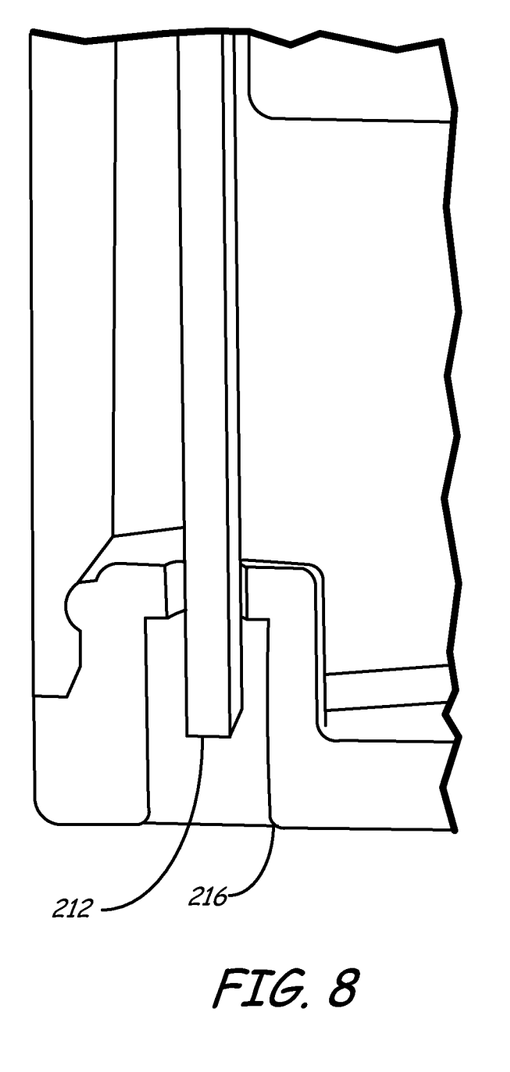
FIG. 8 illustrates a partial cut away view of a head-mount temperature transmitter in accordance with an embodiment of the present invention.

In accordance with another embodiment of the present invention, a new head-mount transmitter electronics module 200 can be provided that includes conductors placed within a base thereof such that corresponding pins in adapter module 118 can automatically mate with such conductors to provide electrical contact. In this situation, the screw terminals of module 200 need not be used. FIG. 7 illustrates a partial perspective cut away view of module 200 as well as a bottom perspective view thereof. FIG. 8 illustrates an enlarged partial cut away view of a pin 212 recessed within an aperture 216 in accordance with an embodiment of the present invention. Each screw terminal 210 is electrically coupled to a conductor 212 that is located proximate a base portion 214. Base 214 includes interconnect surface 215 which preferably includes a number of holes or apertures 216 to essentially recess the conductors 212 from interconnect surface 215. In this manner, electrical contact with conductors 212 may only be accomplished via a suitably sized pin passing into aperture 216 disposed on interconnect surface 215 in order to mate with the respective conductor 212. Preferably, such electrical connection is done using spring-loaded contact pins present in and extending from a surface of adapter module 118.

One issue that arises for some embodiments of the present invention occurs during the use of thermocouple sensors. Specifically, the issue pertains to the ability of embodiments of the present invention to accurately measure the cold junction temperature. Typically, an on-board platinum resistive thermometer (PRT) is used to measure the temperature of the sensor terminals. Ideally, the PRT would be placed as close to the terminal connections as possible. In the configuration shown in FIG. 4, the on-board PRT in transmitter electronics module (or puck) 120 cannot be used to compensate for the cold junction voltage because it is too far from the sensor terminal connections since the sensor terminal connections are disposed in first compartment 114 of housing 112, and that is where the potentially dissimilar metals of the junction occurs. Current dual-compartment housings do have a terminal block that includes a platinum resistance thermometer. In accordance with an embodiment of the present invention, the platinum resistance thermometer of the terminal block of the dual-compartment housing is coupled to transmitter electronics module 120 such that puck 120 can still perform cold junction compensation when used in such an arrangement. Further still, puck 120 may include a jumper, switch, or automatic sensing circuitry to disable its internal cold junction PRT and use the external input cold junction PRT from the terminal block disposed in the first compartment. The transmitter electronics module 120 can be configured to automatically detect if it is connected to adapter module 118 by means of a standard open-sensor current pulse. If electronics puck 120 is not connected to adapter module 118, the current diagnostic would see high impedance and puck would know that it is not connected. The diagnostic would allow the device to understand which PRT to use for cold junction compensation without intervention of a user.

Embodiments described above allow a relatively lower cost electronics module of the head-mount type to be used in conjunction with a dual-compartment housing to prove additional robustness and/or to reduce susceptibility to electromagnetic interference. It is believed that embodiments of the present invention will provide a device that is more robust than a traditional head-mount temperature transmitter, but less expensive than a traditional dual-compartment temperature transmitter.

Although the present invention has been described with reference to preferred embodiments, workers skilled in the art will recognize that changes may be made in form and detail without departing from the spirit and scope of the invention.

What is claimed is:

1. A temperature transmitter comprising:
   a cylindrical dual-compartment housing having a first compartment and a second compartment, the first compartment being configured to receive field wiring at a terminal block through at least one conduit, the first and second compartments being separated except for an electrical feedthrough therebetween;
   a head-mount temperature transmitter electronics module used to measure a process temperature disposed in the second compartment and being operably coupled to the terminal block in the first compartment; and
   an adapter module disposed in the second compartment which electrically connects the head-mount temperature transmitter electronics module to the terminal block including at least one alignment feature configured to maintain the head mount temperature transmitter in a unique rotational position.

2. The temperature transmitter of claim 1, wherein the adapter module is sized to be received by the second compartment.

3. The temperature transmitter of claim 2, wherein the adapter module includes a number of electrical connectors configured to engage the head-mount temperature transmitter electronics module when it is maintained in the unique rotational position.

4. The temperature transmitter of claim 3, wherein at least one of the electrical connectors is configured to pivot between a disengaged position that allows clearance for the head-mount temperature transmitter electronics module and an engaged position in which the connector is coupled to a screw terminal on a top surface of the head-mount temperature transmitter electronics module.

5. The temperature transmitter of claim 3, wherein at least one of the connectors is accessible through a recess in a surface of the head-mount temperature transmitter electronics module that is opposite a termination surface.

6. The temperature transmitter of claim 1, and further comprising a resistance temperature device coupled to the terminal block and operably coupled to the head-mount temperature transmitter electronics module to provide cold junction compensation.

7. The temperature transmitter of claim 6, wherein the head-mount temperature transmitter electronics module is configured to automatically detect coupling of the resistance temperature device to provide cold junction compensation.

8. The temperature transmitter of claim 6, wherein the head-mount temperature transmitter electronics module includes a circuit to selectably couple the resistance temperature device to the head-mount temperature transmitter electronics module.

9. The temperature transmitter of claim 1, wherein the head-mount temperature transmitter electronics module is coupled to the terminal block through an electromagnetic interference filter.

10. A cylindrical dual-compartment head-mount temperature transmitter comprising:
    a termination surface including a plurality of screw terminals;

transmitter electronics configured to measure an electrical property of a temperature sensor and provide an indication thereof over a process communication loop related to a process temperature;

an interconnect surface opposite the termination surface, the interconnect surface having a plurality of apertures; and a plurality of conductors, each conductor is coupled to one of the screw terminals, extends toward the interconnect surface, and is recessed from the interconnect surface within one of the apertures.

11. The head-mount temperature transmitter of claim 10, wherein the transmitter is circular and has a diameter of 2.4 inches or less.

12. The head-mount temperature transmitter of claim 11, wherein the transmitter has a diameter of 1.7 inches or less.

13. The head-mount temperature transmitter of claim 10, wherein the head-mount temperature transmitter is configured to automatically detect coupling of a resistance temperature device to provide cold junction compensation based on an external temperature sensor.

\* \* \* \* \*